Figure 1:
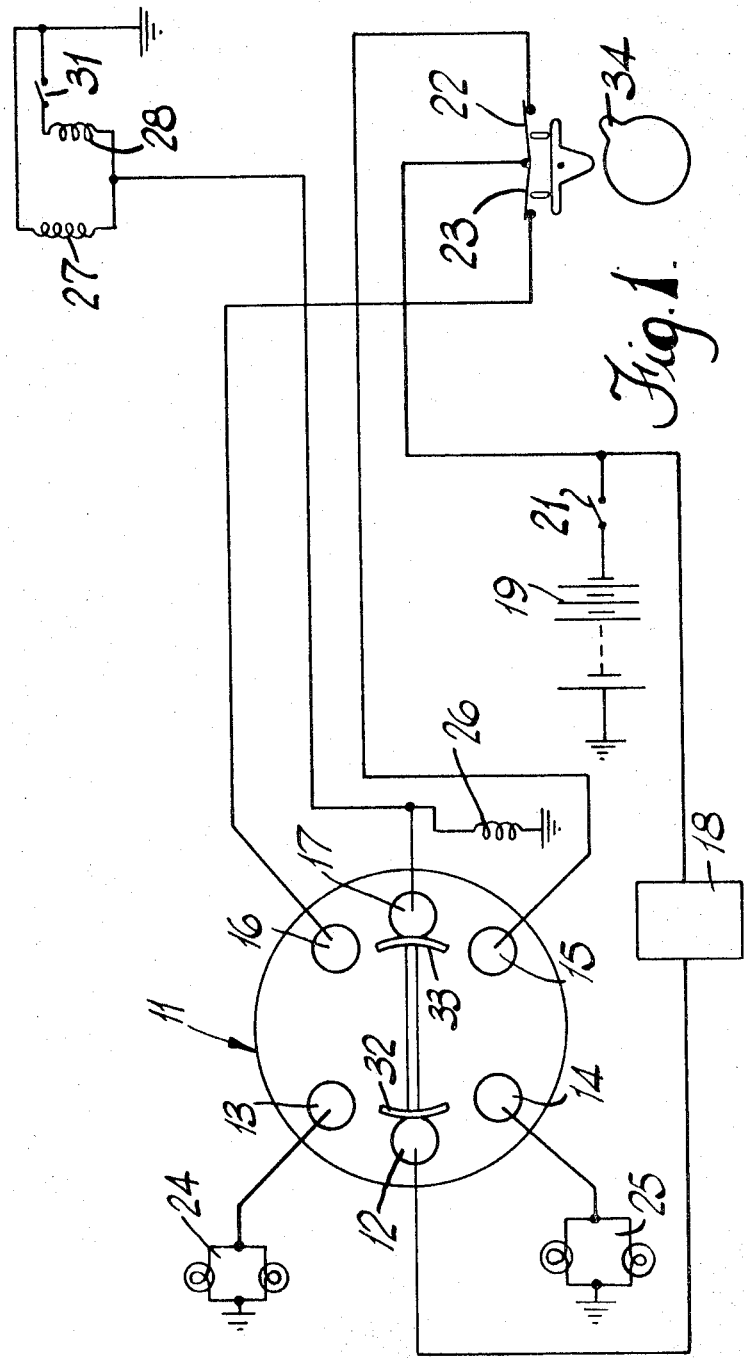

United States Patent

[11] 3,585,583

| [72] | Inventors | Derek Thornley Nelson; Leslie James Nevett, Walley, both of, England |
|---|---|---|
| [21] | Appl. No. | 691,431 |
| [22] | Filed | Dec. 18, 1967 |
| [45] | Patented | June 15, 1971 |
| [73] | Assignee | Joseph Lucas Industries Limited Birmingham, England |
| [32] | Priority | Dec. 21, 1966 |
| [33] | | Great Britain |
| [31] | | 57,180/66 |

[54] DIRECTION INDICATOR SYSTEMS FOR ROAD VEHICLES
1 Claim, 2 Drawing Figs.

| [52] | U.S. Cl. | 340/55, 200/61.34 |
|---|---|---|
| [51] | Int. Cl. | B60q 1/38 |
| [50] | Field of Search | 340/55, 56, 67, 73 |

[56] References Cited
UNITED STATES PATENTS

| 1,620,456 | 3/1927 | Gallus et al. | 340/56 UX |
| 2,032,850 | 3/1936 | O'Shea | 340/56 UX |
| 2,528,160 | 10/1950 | Miller | 200/61.39 X |
| 3,316,533 | 4/1967 | Kell | 340/56 |

FOREIGN PATENTS

| 1,049,149 | 8/1953 | France | 340/73 |
| 488,671 | 12/1953 | Italy | 340/74 |
| 563,318 | 5/1957 | Italy | 200/61.37 |

*Primary Examiner*—John W. Caldwell
*Assistant Examiner*—Kenneth N. Leimer
*Attorney*—Glascock, Downing & Seebold ABSTRACT: A direction indicator switch for a road vehicle in which a manually operable direction indicator switch is movable from a neutral position to either of a pair of operative positions respectively whereby indicator lamps on opposite sides of the vehicle respectively are energized. The indicator switch includes resilient means urging the direction indicator switch to its neutral position, and electromagnetic means which is operable upon movement of the direction indicator switch to either of its operative positions, for maintaining the switch in its operative position. There is further provided cancelling switch means operable in use by a part moving with the steering wheel of the vehicle so as to break the circuit to said electromagnetic means on completion of a turn and moreover means is provided for holding the operating member of said cancelling switch means out of the path of movement of said part except when the direction indicator switch is in an operative position.

DIRECTION INDICATOR SYSTEMS FOR ROAD VEHICLES

This invention relates to direction indicator systems for road vehicles.

A system according to the invention includes a manually operable direction indicator switch movable from a neutral position to either of a pair of operative positions respectively in which indicator lamps on opposite sides of the vehicle respectively are energized, resilient means urging the direction indicator switch to its neutral position, electromagnetic means operable upon movement of the direction indicator switch to either of its operative position for maintaining the direction indicator switch in its operative position, cancelling switch means operable in use by a part moving with the steering wheel of the vehicle so as to break the circuit to said electromagnetic means on completion of a turn, and means for holding the operating member of the cancelling switch means out of the path of movement of said part except when the direction indicator switch is in an operative position.

Figure 2:
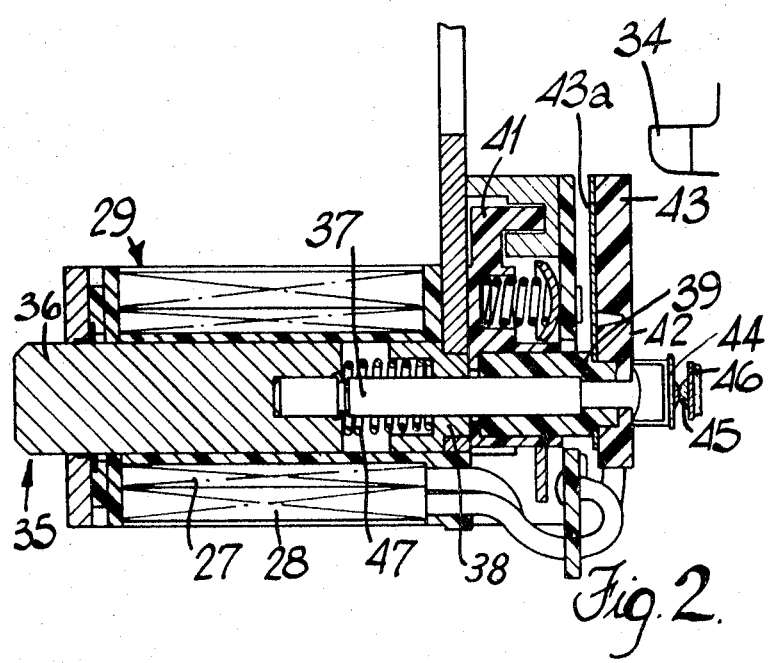

One example of the invention is illustrated in the accompanying drawings wherein, FIG. 1 is a circuit diagram, and FIG. 2 is a sectional view of the cancelling means used in the system.

Referring to the drawings the system comprises a manually operable switch 11 having six terminals 12, 13, 14, 15, 16 and 17 respectively. The terminal 12 is connected through a flasher unit 18 and the ignition switch 21 of the road vehicle in series to one terminal of the battery 19 of the vehicle, the other terminal of the battery 19 being grounded. The terminals 13, 14 of the switch are connected respectively through the right-hand and left-hand indicator lamps 24, 25 of the vehicle to ground. The terminals 15, 16 of the switch 11 are connected respectively through normally closed switches 22, 23 in series with the ignition switch 21 to the battery 19 while the terminal 17 is connected to ground through coil 26 of a solenoid associated with the switch 11, and through coils 27, 28 in parallel of a further solenoid 29 associated with the cancelling means of the system, the coil 28 being grounded through a switch 31. The switch 11 includes an interconnected pair of arcuate bridging contacts 32, 33, the contact 32 being associated with the terminals 12, 13, and 14 while the contact 33 is associated with the terminals 15, 16 and 17. The contacts 32, 33 are manually movable and are urged to an inoperative position, wherein they engage the terminals 12, 17 respectively, by resilient means, (not shown).

Rotatable with the steering wheel of the vehicle is a lug 34 which, in use, cooperates with the cancelling means 35 of the system. The cancelling means 35 is secured to the steering column of the vehicle and includes the solenoid 29, plunger 36 of which is provided with an axial extension 37 which extends through a fixed bushing 38 in which the extension 37 is supported for both axial and angular movement. The extension 37 carries at its free end a stub shaft 39 of noncircular cross section. The shaft 39 has rotatable therewith a rotary member 41 which carries the movable contacts of the switches 22, 23 and has secured thereto at its free end remote from the solenoid 29 a radially extending striker 42. The arrangement is such that on energization of the coils 27, 28 of the solenoid 29, the striker 42 will be moved into the path of the lug 34, against the action of a spring 47. Spring means (not shown) are provided for returning the striker 42 and its associated parts to a central position when they are moved angularly in either direction. The striker 42 is provided with a resilient portion 43 at its free end which flexes in the event that the striker 42 engages the lug 34 when the coils 27, 28 are energized, the resilient portion 43 being urged to its operative position by a leaf spring 43a associated with the striker.

The operation of the system is as follows:

When the vehicle is to perform a right-hand turn the driver of the vehicle operates the direction indicator lever, which moves the contacts 32, 33 to a position where they interconnect respectively the terminals 12, 13, and 15, 17 of the switch 11, with the contact 32 thereby completing the electrical circuits through the right-hand indicator lamps 24 to energize the lamps while the contact 33 completes the circuits through the coil 26 and through the coils 27, 28 via the switch 22. Thus, the solenoid 29 and the coil 26 are energized, the solenoid with which the coil 26 is associated serving when the coil 26 is energized, to maintain the contacts 32, 33 in their operative position. Energization of the solenoid 29 acts through the coils 27, 28 to move the striker 42 into the path of the lug 34 and as the striker 42 is moved to its operative position, the switch 31 is opened to break the circuit through the coil 28, with the hold-on coil 27 remaining energized to maintain the striker 42 in its operative position. The switch 31 includes a fixed contact 44 and a movable contact 45, the movable contact being mounted at one end of a leaf spring 46. In the inoperative position of the striker 42, the spring 46 urges the contact 45 into engagement with the contact 44 thereby completing the circuit between the contact 17 and the coil 28. However, as the striker 42 is moved to its operative position, the striker 42 engages the spring 46 and moves the contacts 44, 45 apart thereby breaking the circuit to the coil 28.

As the driver of the vehicle turns the steering wheel to perform the turn, the lug 34 engages the striker and causes it to rotate against the action of the spring means to allow the lug to pass, whereupon the striker is returned to its central position by the spring means. The rotation of the striker is transmitted to the member 41 to open the switch 23 momentarily, and since the switch 23 is not in circuit at this time, the system is unaffected. However, at the completion of the turn, the steering wheel is rotated in the opposite direction and the lug 34 again engages the striker 42 which is now rotated against the action of the spring means in the other direction. This movement of the striker is transmitted to the member 41 to open the switch 22 momentarily. When the switch 22 is opened, the circuits through the coil 26 and the coil 27 are broken and their respective solenoids are deenergized thereby allowing the contacts 32, 33 to be returned to their inoperative position and allowing the striker 42 to be withdrawn from the path of the lug 34. Since the contact 32 has returned to its inoperative position, the lamps 24 will be extinguished.

It will be appreciated that the operation of the system for a left-hand turn is similar to that described for a right-hand turn.

In a modification, the switch 31 is constituted by a slider carried by the striker 42, which, in the inoperative position of the striker 42, engages a conductive strip carried by a part which is fixed relative to the striker, thereby completing the circuit between the coil 28 and the terminal 17. However, in the operative position of the striker 42, the slider is clear of the conductive strip and rests on an insulator, thereby breaking the circuit to the coil 28.

Having thus described my invention what I claim as new and desire to secure by Letters Patent is:

1. A direction indicator system for a road vehicle having indicator lamps on opposite sides thereof, a battery, an ignition switch, and a steering wheel, including a manually operable direction indicator switch movable from a neutral position to either of a pair of operative positions respectively in which the indicator lamps on opposite sides of the vehicle respectively are energized, resilient means urging the direction indicator switch to its neutral position, electromagnetic means operable upon movement of the direction indicator switch to either of its operative positions for maintaining said switch in its operative position, cancelling switch means operable in use by a part moving with the steering wheel to break the circuit to said electromagnetic means upon completion of a turn, an operating member for the cancelling switch means, a solenoid having a plunger, said operating member being carried by said plunger, means for holding the operating member of said cancelling switch means out of the path of movement of said part except when said direction indicator switch is in an operative position, said solenoid being energized to move said operating member into the path of movement of said part when said direction indicator switch is moved to one of its operative positions, and said cancelling switch means including a pair of normally closed switches connected between the battery and the respective contacts of the direction indicator switch, said direction indicator switch contacts being connected respectively to the solenoid when the direction indicator switch is moved to its operating positions respectively, and said operating member being cooperable with both of said normally closed switches and movable to open the respective one of said normally closed switches when the turn indicated is completed thereby breaking the circuits to the electromagnetic means and the solenoid, with said direction indicator switch and solenoid returning to their rest conditions.